United States Patent
Kasperchik et al.

(10) Patent No.: US 12,330,369 B2
(45) Date of Patent: Jun. 17, 2025

(54) THREE-DIMENSIONAL PRINTING

(71) Applicant: PERIODT PRINT LLC, Palo Alto, CA (US)

(72) Inventors: Vladek Kasperchik, Corvallis, OR (US); David A. Champion, Corvallis, OR (US); Douglas Pederson, Corvallis, OR (US)

(73) Assignee: Peridot Print LLC, Palo Alto, CA (US)

( * ) Notice: Subject to any disclaimer, the term of this patent is extended or adjusted under 35 U.S.C. 154(b) by 718 days.

(21) Appl. No.: 17/045,534

(22) PCT Filed: Sep. 14, 2018

(86) PCT No.: PCT/US2018/051154
§ 371 (c)(1),
(2) Date: Oct. 6, 2020

(87) PCT Pub. No.: WO2020/055429
PCT Pub. Date: Mar. 19, 2020

(65) Prior Publication Data
US 2021/0187840 A1    Jun. 24, 2021

(51) Int. Cl.
*B29C 64/165* (2017.01)
*B29C 64/188* (2017.01)
(Continued)

(52) U.S. Cl.
CPC .......... *B29C 64/165* (2017.08); *B29C 64/188* (2017.08); *B29K 2091/00* (2013.01); *B33Y 10/00* (2014.12); *B33Y 70/10* (2020.01)

(58) Field of Classification Search
CPC ..... B29C 64/165; B29C 64/188; B33Y 10/00; B33Y 70/10
See application file for complete search history.

(56) References Cited

U.S. PATENT DOCUMENTS 6,288,200 B1 * 9/2001 Jung ................. C08L 97/02
527/401
6,324,438 B1 * 11/2001 Cormier .............. C08J 5/122
700/98

(Continued)

FOREIGN PATENT DOCUMENTS

WO    WO-2016171724    10/2016
WO    WO-2017162306    9/2017
(Continued)

OTHER PUBLICATIONS

Vapor Pressures and Boiling Points of Some Paraffin, Alkylcyclopentane, Alkylcyclohexane, and Alkylbenzene Hydrocarbons, Journal of Research of the National Bureau of Standards, vol. 35, pp. 219-244, U.S. Department of Commerce, https://nvlpubs.nist.gov/nistpubs/jres/35/ (Year: 1945).*

(Continued)

*Primary Examiner* — Russell E Sparks
(74) *Attorney, Agent, or Firm* — Dierker & Kavanaugh, P.C.

(57) ABSTRACT

A three-dimensional (3D) object printing kit includes a polymeric material; a fusing agent including at least 5 vol % of a polar solvent; and a detailing agent. The detailing agent includes a non-polar, hydrophobic substance selected from the group consisting of a non-polar, hydrophobic liquid in its liquid state at a temperature ranging from about −80° C. to about 40° C., and a non-polar, hydrophobic wax having a melting temperature less than 120° C.

13 Claims, 4 Drawing Sheets

(51) Int. Cl.
*B29K 91/00* (2006.01)
*B33Y 10/00* (2015.01)
*B33Y 70/10* (2020.01)

(56) References Cited

U.S. PATENT DOCUMENTS

| | | | |
|---|---|---|---|
| 9,505,058 B2 | 11/2016 | Wu et al. | |
| 9,770,738 B2* | 9/2017 | Bachar | C08K 5/521 |
| 10,899,940 B2* | 1/2021 | Chopra | C09D 11/102 |
| 2005/0059757 A1* | 3/2005 | Bredt | B33Y 70/10 |
| | | | 106/443 |
| 2017/0151722 A1 | 6/2017 | Prasad et al. | |
| 2017/0225396 A1 | 8/2017 | Tom et al. | |
| 2018/0015663 A1 | 1/2018 | Zhao et al. | |
| 2018/0022923 A1 | 1/2018 | Emamjomeh et al. | |
| 2018/0104897 A1 | 4/2018 | Novick | |
| 2018/0133957 A1 | 5/2018 | Ramirez Muela et al. | |

FOREIGN PATENT DOCUMENTS

| | | | |
|---|---|---|---|
| WO | WO-2017213666 | 12/2017 | |
| WO | WO-2018006935 | 1/2018 | |
| WO | WO-2018194542 A1 * | 10/2018 | ........... B29C 64/165 |

OTHER PUBLICATIONS

MP, Tg, and Structure of Common Polymers, PerkinElmer Inc., https://resources.perkinelmer.com/corporate/cmsresources/images/44-74863tch_mptgandstructureofcommonpolymers.pdf (Year: 2023).*
Viscosity of Paraffin Wax, Anton Paar, https://wiki.anton-paar.com/us-en/paraffin-wax/ (Year: 2023).*

* cited by examiner

THREE-DIMENSIONAL PRINTING

BACKGROUND

Three-dimensional (3D) printing may be an additive printing process used to make three-dimensional solid parts from a digital model. 3D printing is often used in rapid product prototyping, mold generation, mold master generation, and short run manufacturing. Some 3D printing techniques are considered additive processes because they involve the application of successive layers of material (which, in some examples, may include build material, binder and/or other printing liquid(s), or combinations thereof). This is unlike traditional machining processes, which often rely upon the removal of material to create the final part. Some 3D printing methods use chemical binders or adhesives to bind build materials together. Other 3D printing methods involve at least partial curing, thermal merging/fusing, melting, sintering, etc. of the build material, and the mechanism for material coalescence may depend upon the type of build material used.

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Figure 1:
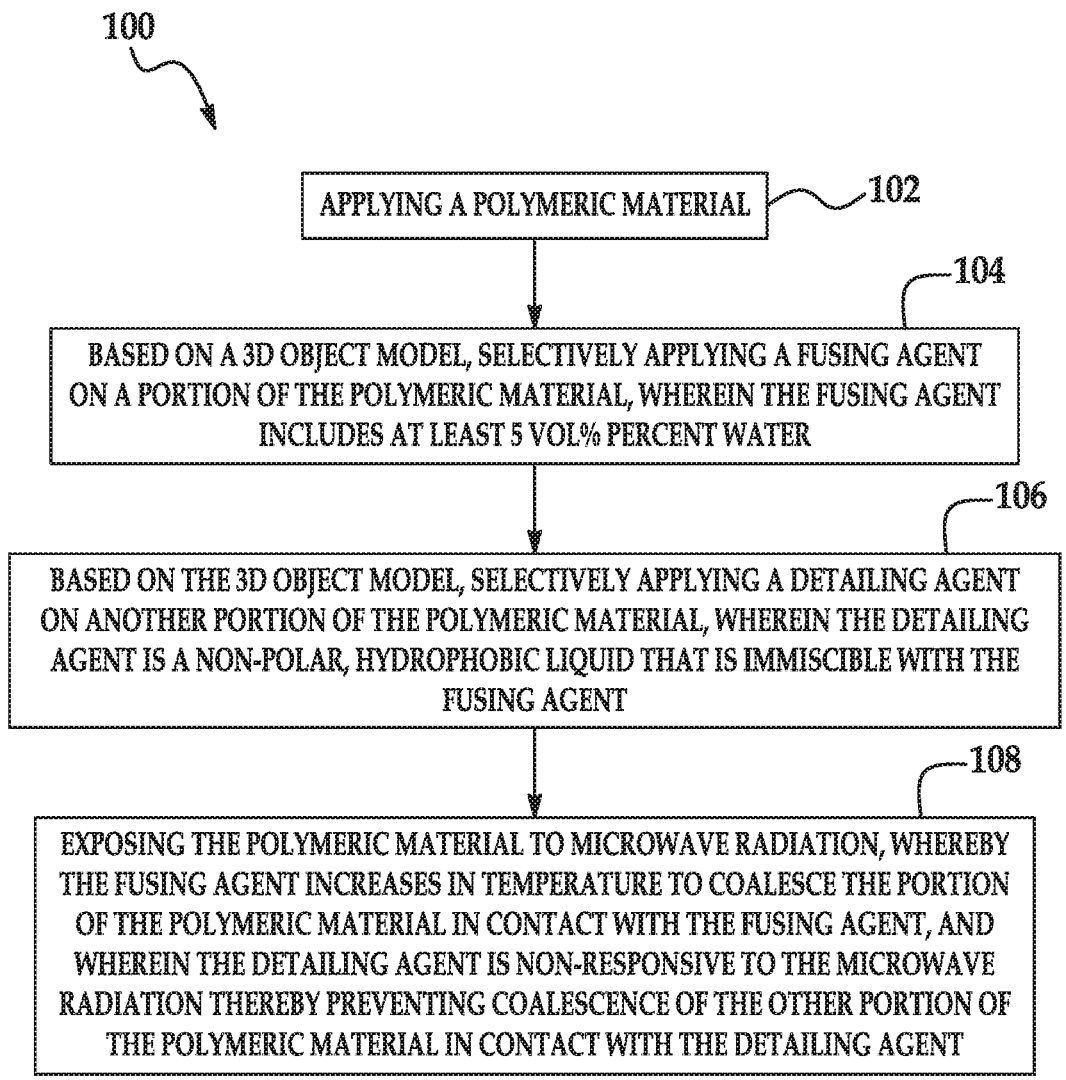
FIG. 1 is a flow diagram depicting an example of a three-dimensional printing method using an example of a detailing agent disclosed herein.

Disclosed herein are liquid functional agents suitable for use in a three-dimensional printing method that utilizes microwave energy to coalesce (e.g., melt, fuse, etc.) selected regions of a polymeric build material layer. As used herein, microwave energy or radiation refers to electromagnetic radiation with wavelengths ranging from 1 m to 1 mm; with frequencies between 300 MHz and 300 GHz.

One of the liquid functional agents disclosed herein is a fusing agent, which is capable of absorbing microwave radiation and converting the absorbed radiation to thermal energy which in turn coalesces the build material that is in contact with the fusing agent. As such, the fusing agent may be used to pattern build material that is to become part of a final 3D object.

Another of the liquid functional agents disclosed herein is a detailing agent, which is both immiscible with the fusing agent and non-responsive to the microwave radiation. Its immiscibility with the fusing agent enables the detailing agent to block the fusing agent from spreading into undesirable area(s) of a build material layer. Its non-responsiveness to microwave radiation keeps the detailing agent from absorbing the microwave radiation or otherwise being excited by the microwave radiation. As such, the build material in contact with the detailing agent does not heat up and is prevented from coalescing. These characteristics of the detailing agent help to define the patterned voxels that are to be coalesced and improve the edge definition of the final 3D object.

3D Printing Kits

The polymeric build material, the fusing agent, and the detailing agent disclosed herein may be part of a 3D printing kit and/or a 3D printing composition.

In an example, the three-dimensional (3D) printing kit or composition comprises: a polymeric material; a fusing agent including at least 5 vol % of a polar solvent; and a detailing agent, wherein the detailing agent includes a non-polar, hydrophobic substance selected from the group consisting of a non-polar, hydrophobic liquid in its liquid state at a temperature ranging from about −80° C. to about 40° C., and a non-polar, hydrophobic wax having a melting temperature less than 120° C.

In some examples, the 3D printing kit or composition consists of the polymeric material, the fusing agent, and the detailing agent with no other components. In other examples, the 3D printing kit or composition may include other components, such as a coloring agent that is used to impart color to the final 3D object.

As used herein, "material set" or "kit" may, in some instances, be synonymous with "composition." Further, "material set" and "kit" are understood to be compositions comprising one or more components where the different components in the compositions are each contained in one or more containers, separately or in any combination, prior to and during printing but these components can be combined together during printing. The containers can be any type of a vessel, box, or receptacle made of any material. In an example, the components of the kit may be maintained separately until used together in examples of the 3D printing method disclosed herein.

Each of the polymeric material, the fusing agent, and the detailing agent utilized in examples of the 3D printing kit will now be described.

Polymeric Material

In the examples disclosed herein, the build material may be any polymeric material that does not substantially absorb microwave radiation. The phrase "does not substantially absorb" means that the absorptivity of the polymeric material at a particular wavelength is 25% or less (e.g., 20% or less, 10% or less, 5% or less, etc.).

Examples of suitable polymeric materials are those that are based on non-polar monomer segments or low polarity monomer segments such that the polymeric materials have low microwave radiation absorptivity. Such low microwave radiation absorptivity will be found in polymers made up of molecular segments that have small dipole moment values (i.e., less than 0.1 D (debye)) and low mobility. Monomers forming such polymers may also have a low dielectric constant (i.e., <<10 and often <5) in the liquid state. The dielectric constant is a dimensionless property of an electrical insulating material equal to the ratio of the capacitance of a capacitor filled with the given material to the capacitance of an identical capacitor in a vacuum without the dielectric material. Some specific examples of the polymeric material are selected from the group consisting of polyethylene, polypropylene, polyvinylidene fluoride (PVDF), polystyrene, acrylonitrile butadiene styrene (ABS), polytetrafluoroethylene (PTFE), thermoplastic synthetic elastomers based on non-polar monomer segments, and combinations thereof. Some examples of suitable thermoplastic elastomers are olefinic thermoplastic elastomers which are blends of polyethylene, polypropylene, block copolymers of polypropylene, etc. with ethylene propylene rubbers, styrene ethylene butadiene rubbers, etc.

Other polymeric materials may be used, as long as the number of polar groups is low enough to maintain the characteristic that the polymeric material does not substantially absorb microwave radiation. For example, some polyamides, polyacetals, polyesters, polyurethanes, polyoxymethylene (POM), polyether ether ketone (PEEK), polyetherketoneketone (PEKK), polyphenylene sulfide (PPS), or copolymers of these materials may be used.

The melting point or melting range or glass transition temperature of the polymeric material may depend upon the material used, and in an example ranges from about 80° C. to about 350° C. For examples, low-density polyethylene materials may melt anywhere from 105° C. to about 115° C., high-density polyethylene materials may melt anywhere from 120° C. to about 180° C., polypropylene may melt at about 160° C., and PTFE may melt around 326° C. It is to be understood that for any of the amorphous polymeric materials mentioned herein (e.g., ABS), the material has a glass transition temperature.

In some examples, the polymeric material may be in the form of a powder. In other examples, the polymeric material may be in the form of a powder-like material, which includes, for example, short fibers having a length that is greater than its width. In some examples, the powder or powder-like material may be formed from, or may include, short fibers that may, for example, have been cut into short lengths from long strands or threads of material.

The polymeric material may be made up of similarly sized particles and/or differently sized particles. In an example, the average particle size of the polymeric material ranges from about 2 μm to about 200 μm. In another example, the average particle size of the polymeric material ranges from about 10 μm to about 110 μm. In still another example, the average particle size of the polymeric material ranges from about 20 μm to about 100 μm. The term "average particle size", as used herein, may refer to a number-weighted mean diameter or a volume-weighted mean diameter of a particle distribution. In a specific example, the volume-weighted mean diameter of a particle distribution of the polymeric material ranges from about 2 μm to about 200 μm.

In some examples, 100% of the build material is the polymeric material. In other examples, the build material may include the polymeric material, along with other additives, such as fillers, whiteners, antioxidants, anti-static agents, flow aids, or combinations thereof that do not substantially absorb microwave radiation.

Detailing Agent

In examples of the present disclosure, the detailing agent may include a non-polar, hydrophobic substance selected from the group consisting of a non-polar, hydrophobic liquid in its liquid state at a temperature ranging from about −80° C. to about 40° C., and a non-polar, hydrophobic wax having a wax melting temperature less than 120° C.

The non-polar, hydrophobic substance may be present in the detailing agent in an amount ranging from about 80 vol % to 100 vol % of a total volume of the detailing agent. In some examples, the non-polar, hydrophobic substance may be present in the detailing agent in an amount ranging from about 99 vol % to 100 vol % of a total volume of the detailing agent.

When the detailing agent includes less than 100 vol % of the non-polar, hydrophobic substance, the detailing agent may also include other additives. Suitable detailing agent additives will not substantially absorb microwave radiation and/or will not deleteriously affect the jettability of the detailing agent. As an example of a detailing agent additive, a dye may be added in an amount of 1 wt % or less. As another example of a detailing agent additive, a second non-polar, hydrophobic substance (e.g., a non-polar co-solvent, another non-polar wax, or combinations thereof) may be used as the balance of the detailing agent. As still another of a suitable detailing agent additive, a non-polar surfactant may be used.

In some examples of the present disclosure, the non-polar, hydrophobic substance is the liquid, and the liquid is an isoparaffinic hydrocarbon. The isoparaffinic hydrocarbon may have any dynamic viscosity suitable for being selectively applied in accordance with the techniques disclosed herein. In some examples of the present disclosure, the isoparaffinic hydrocarbon may have a dynamic viscosity ranging from about 0.8 centipoise (cP) to about 40 cP at an application temperature ranging from about −80° C. to about 40° C. Some commercially available examples of the isoparaffinic hydrocarbon include those under the tradename ISOPAR®, such as ISOPAR® G (C10-C11 isoparaffin, dynamic viscosity 0.84 cP), ISOPAR® H (C11-C12 isoparaffin, dynamic viscosity 1.13 cP), ISOPAR® L (C11-C13 isoparaffin, dynamic viscosity 1.21 cP), ISOPAR® M (C13-C14 isoparaffin, dynamic viscosity 3.04 cP), and ISOPAR® V (an isoparaffinic hydrocarbon with a dynamic viscosity 13.85 cP) (all of which are available from ExxonMobil).

In other examples, the non-polar, hydrophobic substance is the wax, and the wax is a paraffin wax, or a polyolefin wax having a melt viscosity of 40 centipoise (cP) or less. The non-polar, hydrophobic wax may form a liquid (sometimes referred to herein as a second liquid) having a dynamic viscosity ranging from about 0.8 centipoise (cP) to about 40 cP when the non-polar, hydrophobic wax is heated to at least the wax melting temperature. In these examples, the melted form of the wax is the non-polar, hydrophobic liquid that can be selectively applied in accordance with the techniques disclosed herein.

In examples of the present disclosure, the non-polar, hydrophobic substance may have a sub-atmospheric distillation temperature lower than a melting temperature or a glass transition of the polymeric material.

The detailing agent may be jettable via piezoelectric inkjet printheads or thermal inkjet printheads. In some examples, piezoelectric printheads may be selected as the jetting efficiency may be enhanced as compared to thermal inkjet printheads.

Fusing Agent

In the examples disclosed herein, the fusing agent includes at least 5 vol % of a polar solvent. The polar solvent may make up anywhere from 5 vol % to 100 vol % of the fusing agent. The polar solvents are heated as their component molecules are forced to rotate with the high frequency electric field of the applied microwave radiation. In effect, the polar solvent absorbs the microwave radiation. As such, a higher polar solvent content may result in higher microwave absorptivity.

Examples of suitable polar solvents include those solvents having a dielectric constant greater than 10, and in some instances, greater than 20. Some examples include water, formamides, alcohols, ketones, acids, or combinations thereof. Some specific examples includes dimethylformamide, primary aliphatic alcohols, secondary aliphatic alcohols, 1,2-alcohols, 1,3-alcohols, 1,5-alcohols, 2-pyrrolidone, N-methyl-2-pyrrolidone, etc.

In addition to the polar solvent, the fusing agent may also include a microwave energy absorber. Examples of suitable microwave energy absorbers or susceptors include carbon black, graphite, various iron oxides (e.g., oxides of iron (II), iron (III), or iron (II, III) (i.e., magnetite)), or other microwave ferromagnetic nanoparticles.

Examples of suitable carbon black pigments that may be included in the fusing agent include those manufactured by Mitsubishi Chemical Corporation, Japan (such as, e.g., carbon black No. 2300, No. 900, MCF88, No. 33, No. 40, No. 45, No. 52, MA7, MA8, MA100, and No. 2200B); various carbon black pigments of the RAVEN® series manufactured by Columbian Chemicals Company, Marietta, Georgia, (such as, e.g., RAVEN® 5750, RAVEN® 5250, RAVEN® 5000, RAVEN® 3500, RAVEN® 1255, and RAVEN® 700); various carbon black pigments of the REGAL® series, the MOGUL® series, or the MONARCH® series manufactured by Cabot Corporation, Boston, Massachusetts, (such as, e.g., REGAL® 400R, REGAL® 330R, and REGAL® 660R); and various black pigments manufactured by Orion Engineered Carbons, (such as, e.g., COLOUR BLACK™ FW1, COLOUR BLACK™ FW2, COLOUR BLACK™ FW2V, COLOUR BLACK™ FW18, COLOUR BLACK™ FW200, COLOUR BLACK™ S150, COLOUR BLACK™ S160, COLOUR BLACK™ S170, PRINTEX® 35, PRINTEX® U, PRINTEX® V, PRINTEX® 140U, SPECIAL BLACK™ 5, SPECIAL BLACK™ 4A, and SPECIAL BLACK™ 4).

In some examples of the fusing agent, the carbon black pigment may be dispersed by a polymeric dispersant having a weight average molecular weight ranging from about 12,000 Daltons to about 20,000 Daltons. In this example, the fusing agent may include the carbon black pigment, the polymeric dispersant, and water (with or without a polar co-solvent, such as 2-pyrrolidone). The polymeric dispersant may be any styrene acrylate or any polyurethane having its weight average molecular weight ranging from about 12,000 Daltons to about 20,000 Daltons. Some commercially available examples of the styrene acrylate polymeric dispersant are JONCRYL® 671 and JONCRYL® 683 (both available from BASF Corp.). Within the fusing agent, a ratio of the carbon black pigment to the polymeric dispersant ranges from about 3.0 to about 4.0. In an example, the ratio of the carbon black pigment to the polymeric dispersant is about 3.6. The polymeric dispersant may contribute to the carbon black pigment exhibiting enhanced electromagnetic radiation absorption.

The amount of the microwave energy absorber that is present in the fusing agent ranges from 0 wt % to about 40 wt % based on the total weight of the fusing agent. In other examples, the amount of the microwave energy absorber in the fusing agent ranges from about 0.3 wt % to 30 wt %, or from about 1 wt % to about 20 wt %. It is believed that these microwave energy absorber loadings provide a balance between the fusing having jetting reliability and heat and/or electromagnetic radiation absorbance efficiency.

Some examples of the fusing agent may also include surfactant(s) and/or dispersing aid(s), antimicrobial agent(s), anti-kogation agent(s), or other additives that improve the jettability of the fusing agent, the ability of the fusing agent to coat the polymeric build material, and/or the ability of the fusing agent to penetrate into voids among the polymeric build material.

Surfactant(s) and/or dispersing aid(s) may be used to improve the wetting properties and the jettability of the fusing agent. Examples of suitable surfactants and dispersing aids include those that are non-ionic, cationic, or anionic. Examples of suitable surfactants/wetting agents include a self-emulsifiable, non-ionic wetting agent based on acetylenic diol chemistry (e.g., SURFYNOL® SEF from Evonik, Inc.), a non-ionic fluorosurfactant (e.g., CAPSTONE® fluorosurfactants from DuPont, previously known as ZONYL FSO), and combinations thereof. In a specific example, the surfactant is a non-ionic, ethoxylated acetylenic diol (e.g., SURFYNOL® 465 from Evonik, Inc.). In other examples, the surfactant is an ethoxylated low-foam wetting agent (e.g., SURFYNOL® 440 or SURFYNOL® CT-111 from Evonik, Inc.) or an ethoxylated wetting agent and molecular defoamer (e.g., SURFYNOL® 420 from Evonik, Inc.). Still other suitable surfactants include non-ionic wetting agents and molecular defoamers (e.g., SURFYNOL® 104E from Evonik, Inc.) or secondary alcohol ethoxylates (commercially available as TERGITOL® TMN-6, TERGITOL® 15-S-7, TERGITOL® 15-S-9, etc. from The Dow Chemical Co.). Examples of suitable dispersing aid(s) include those of the SILQUEST™ series from Momentive, including SILQUEST™ A-1230. Whether a single surfactant or dispersing aid is used or a combination of surfactants and/or dispersing aids is used, the total amount of surfactant(s) and/or dispersing aid(s) in the fusing agent may range from about 0.1 wt % to about 6 wt % based on the total weight of the fusing agent. It is to be understood that these percentages may account for the active material in a surfactant(s) and/or dispersing aid(s) that is less than 100% active.

The fusing agent may also include antimicrobial agent(s). Suitable antimicrobial agents include biocides and fungicides. Example antimicrobial agents may include the NUOSEPT® (Ashland Inc.), UCARCIDE™ or KORDEK™ or ROCIMA™ (Dow Chemical Co.), PROXEL® (Arch Chemicals) series, ACTICIDE® B20 and ACTICIDE® M20 and ACTICIDE® MBL (blends of 2-methyl-4-isothiazolin-3-one (MIT), 1,2-benzisothiazolin-3-one (BIT), and Bronopol) (Thor Chemicals), AXIDE™ (Planet Chemical), NIPACIDE™ (Clariant), blends of 5-chloro-2-methyl-4-isothiazolin-3-one (CIT or CMIT) and MIT under the tradename KATHON™ (Dow Chemical Co.), and combinations thereof. In an example, the fusing agent may include a total amount of antimicrobial agents that ranges from about 0.01 wt % to about 1 wt %. In an example, the antimicrobial agent is a biocide and is present in the fusing agent in an amount of about 0.1 wt % (based on the total weight of the fusing agent). These percentages may include both active antimicrobial agent and other non-active components present with the antimicrobial agent.

An anti-kogation agent may also be included in the fusing agent. Kogation refers to the deposit of dried solids on a heating element of a thermal inkjet printhead. Anti-kogation agent(s) is/are included to assist in preventing the buildup of kogation, and thus may be included when the fusing agent is to be dispensed using a thermal inkjet printhead. Examples of suitable anti-kogation agents include oleth-3-phosphate (commercially available as CRODAFOS™ O3A or CRODAFOS™ N-3 acid) or dextran 500k. Other suitable examples of the anti-kogation agents include CRODAFOS™ HCE (phosphate-ester from Croda Int.), CRODAFOS™ N10 (oleth-10-phosphate from Croda Int.), or DISPERSOGEN® LFH (polymeric dispersing agent with aromatic anchoring groups, acid form, anionic, from Clariant), etc. The anti-kogation agent may be present in the fusing agent in an amount ranging from about 0.1 wt % to about 1 wt % of the total weight of the fusing agent.

The fusing agent may be jettable via any inkjet technology, including thermal inkjet printheads or piezoelectric inkjet printheads.

3D Printing Method

An example of a 3D printing method using examples of the polymeric material, the fusing agent, and the detailing agent disclosed herein is shown in FIG. 1. The method 100 include applying a polymeric material (reference numeral 102); based on a 3D object model, selectively applying a fusing agent on a portion of the polymeric material, wherein the fusing agent includes at least 5 vol % water (reference numeral 104); based on the 3D object model, selectively applying a detailing agent on another portion of the polymeric material, wherein the detailing agent is a non-polar, hydrophobic liquid that is immiscible with the fusing agent (reference numeral 106); and exposing the polymeric material to microwave radiation, whereby the fusing agent increases in temperature to coalesce the portion of the polymeric material in contact with the fusing agent, and wherein the detailing agent is non-responsive to the microwave radiation thereby preventing coalescence of the other portion of the polymeric material in contact with the detailing agent (reference numeral 108). This method 100 is also schematically illustrated in FIGS. 2A through 2C.

Figure 2A:
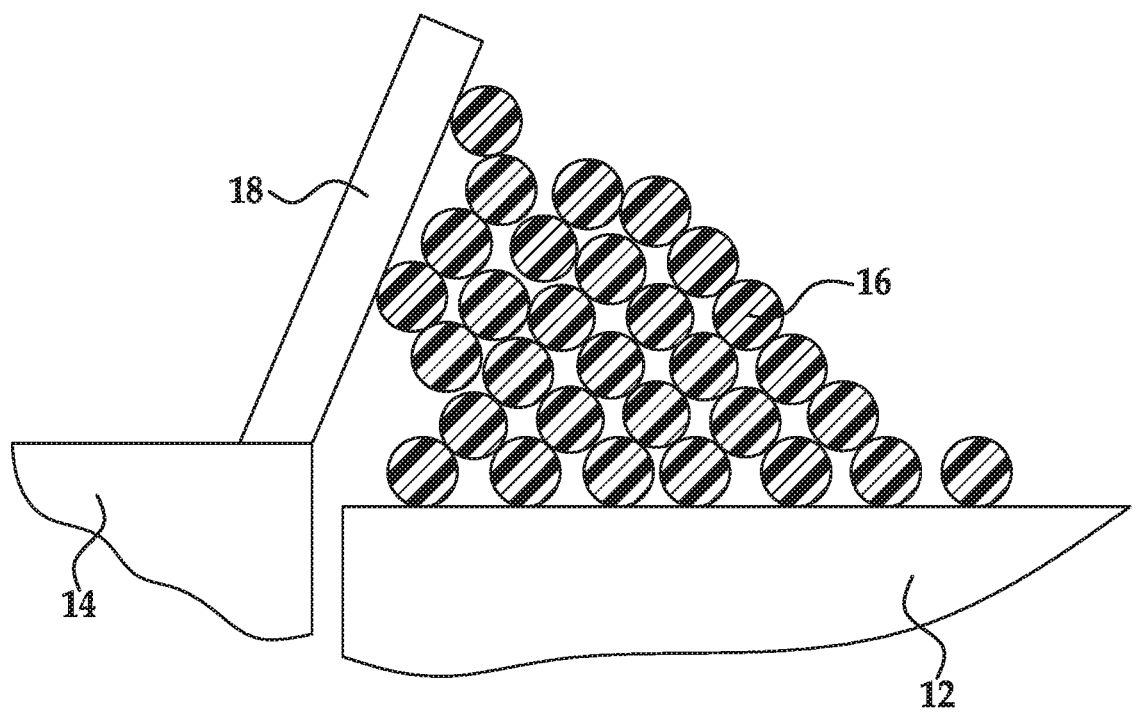
FIGS. 2A through 2D are schematic and partially cross-sectional views depicting the formation of a part layer using an example of a fusing agent and an example of the detailing agent in an example of the three-dimensional printing method disclosed herein.

As shown in FIG. 2A, some examples of the 3D print method include applying a polymeric material 16. The polymeric material 16 may be applied on a build area platform 12. A printing system (e.g., the system 10 shown in FIG. 3) may be used to apply the polymeric material 16. The printing system 10 may include a build area platform 12, a build material supply 14 containing the polymeric material 16, and a build material distributor 18.

The build area platform 12 receives the polymeric material 16 from the build material supply 14. The build area platform 12 may be moved in the directions as denoted by the arrow 15 (see FIG. 3), e.g., along the z-axis, so that the polymeric material 16 may be delivered to the build area platform 12 or to a previously formed layer. In an example, when the polymeric material 16 is to be delivered, the build area platform 12 may be programmed to advance (e.g., downward) enough so that the build material distributor 18 can push the polymeric material 16 onto the build area platform 12 to form a substantially uniform layer of the polymeric material 16 thereon. The build area platform 12 may also be returned to its original position, for example, when a new part is to be built.

The build material supply 14 may be a container, bed, or other surface that is to position the polymeric material 16 between the build material distributor 18 and the build area platform 12. In some examples, the method 100 may further include pre-heating the polymeric material 16 in the build material supply 14 to a supply temperature that is lower than the melting temperature or the glass transition of the polymeric material 16. As such, the supply temperature may depend, in part, on the polymeric material 16 used and/or the 3D printer used. In an example, the supply temperature ranges from about 25° C. to about 150° C. This range is one example, and higher or lower temperatures may be used.

Figure 3:
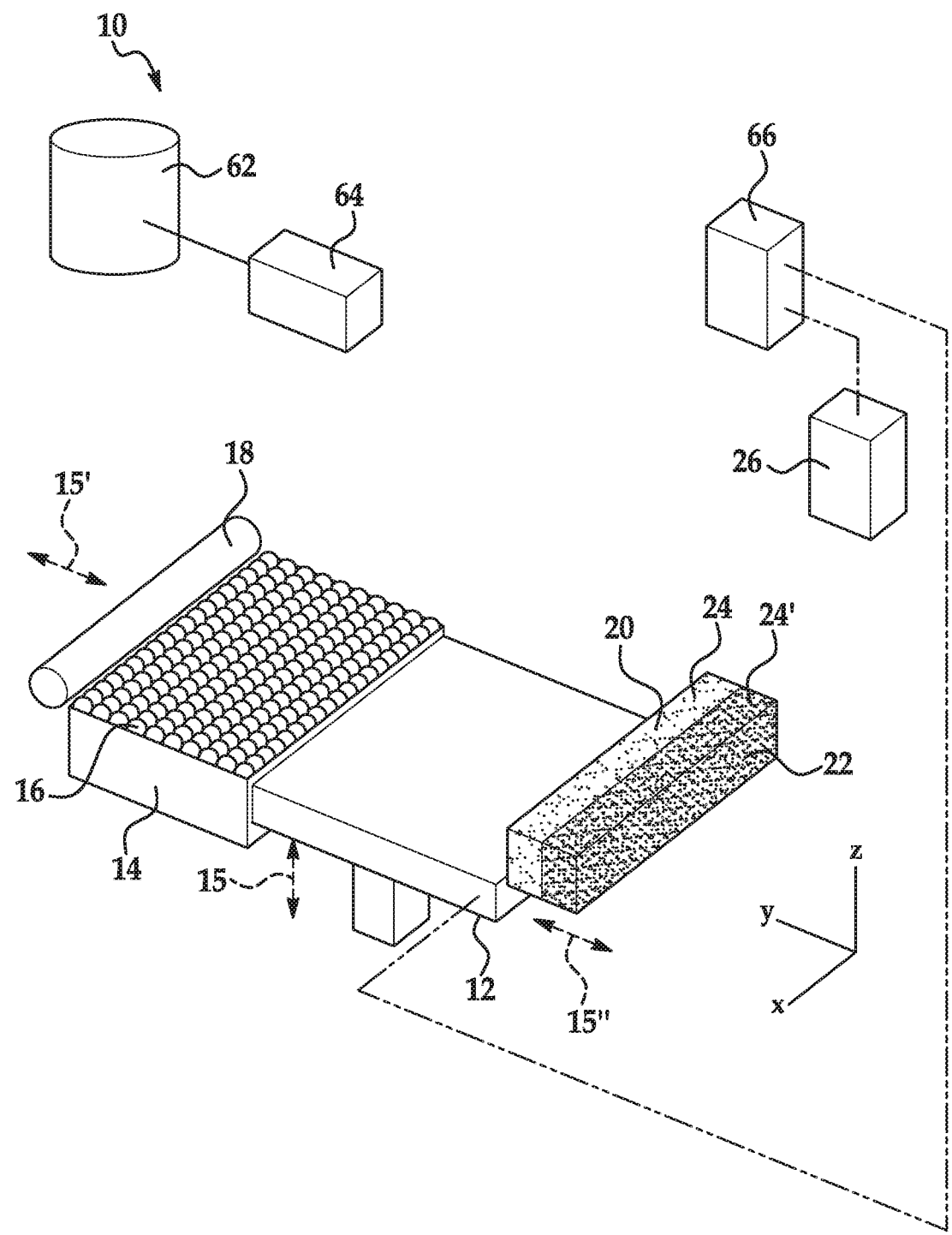
FIG. 3 is a simplified isometric and schematic view of an example of a 3D printing system disclosed herein.

The build material distributor 18 may be moved in the directions as denoted by the arrow 15' (see FIG. 3), e.g., along the y-axis, over the build material supply 14 and across the build area platform 12 to spread the layer of the polymeric material 16 over the build area platform 12. The build material distributor 18 may also be returned to a position adjacent to the build material supply 14 following the spreading of the polymeric material 16. The build material distributor 18 may be a blade (e.g., a doctor blade), a roller, a combination of a roller and a blade, and/or any other device capable of spreading the polymeric material 16 over the build area platform 12. For instance, the build material distributor 18 may be a counter-rotating roller. In some examples, the build material supply 14 or a portion of the build material supply 14 may translate along with the build material distributor 18 such that the polymeric material 16 is delivered continuously to the material distributor 18 rather than being supplied from a single location at the side of the printing system 10 as depicted in FIGS. 2A and 3.

Figure 2B:
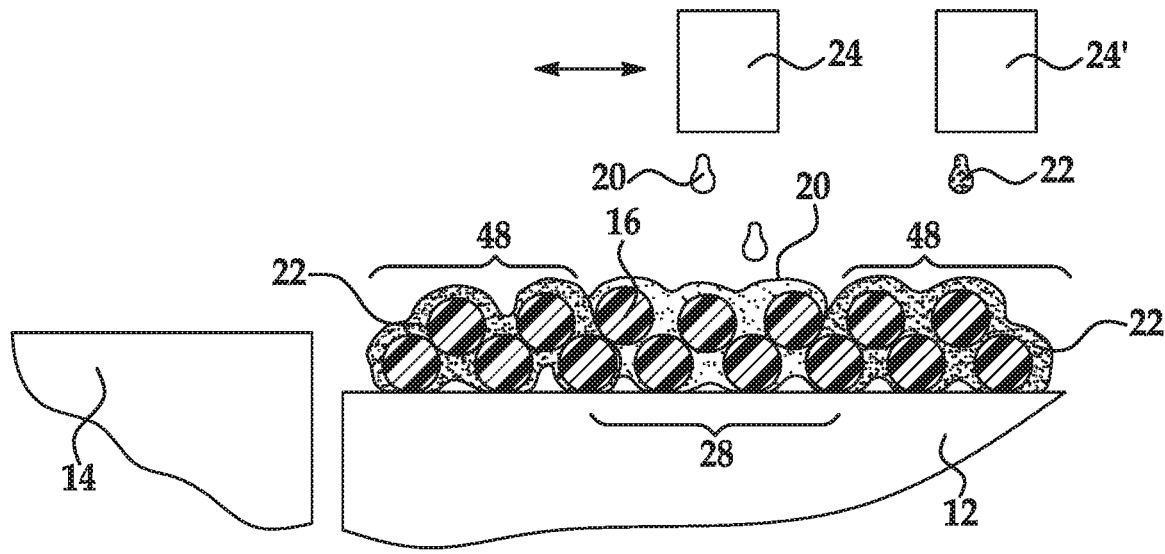

In FIG. 2A, the build material supply 14 may supply the polymeric material 16 into a position so that it is ready to be spread onto the build area platform 12. The build material distributor 18 may spread the supplied treated build material composition 16 onto the build area platform 12. The controller 62 (FIG. 3) may process "control build material supply" data, and in response, control the build material supply 14 to appropriately position the particles of the polymeric material 16, and may process "control spreader" data, and in response, control the build material distributor 18 to spread the polymeric material 16 over the build area platform 12 to form the layer of polymeric material 16 thereon. As shown in FIG. 2B, one build material layer has been formed.

The layer of the polymeric material 16 has a substantially uniform thickness across the build area platform 12. In an example, the polymeric material layer has a thickness ranging from about 50 μm to about 120 μm. In another example, the thickness of the polymeric material layer ranges from about 30 μm to about 300 μm. It is to be understood that thinner or thicker layers may also be used. For example, the thickness of the polymeric material layer may range from about 20 μm to about 500 μm. The layer thickness may be about 2× (i.e., 2 times) the average diameter or size of the polymeric material particles, at a minimum, for finer part definition. In some examples, the layer thickness may be about 1.2× the average diameter of the polymeric material particles.

As depicted in FIG. 2B, examples of the method 100 include, based on a 3D object model, selectively applying a fusing agent 20 on a portion 28 of the polymeric material 16. Any example of the fusing agent described herein may be used, and in an example, the fusing agent 20 may include at least 5 vol % water. In the portion 28, the fusing agent 20 is capable of at least partially penetrating into voids between the polymeric build material particles 16, and is also capable of spreading onto the exterior surface of the polymeric build material particles 16.

Also as depicted in FIG. 2B, examples of the method 100 further include, selectively applying, based on the 3D object model, a detailing agent 22 on another portion 48 of the polymeric material 16. In the other portion 48, the detailing agent 22 is capable of at least partially penetrating into voids between the polymeric build material particles 16, and is also capable of spreading onto the exterior surface of the polymeric build material particles 16. The polymeric material 16 and the detailing agent 22 may be applied so that a volumetric ratio of a total volume of the polymeric material 16 to a total volume of the applied detailing agent 22 within the other portion(s) 48 ranges from about 2:1 to about 200:1.

It is also to be understood that when an agent (e.g., the fusing agent 20 or the detailing agent 22) is to be selectively applied to the polymeric material 16, the agents 20, 22 may be dispensed from an applicator 24, 24'. The applicator(s) 24, 24' may each be a thermal inkjet printhead, a piezoelectric printhead, a continuous inkjet printhead, etc. depending upon the agent 20, 22 that is being dispensed, and thus the selective application of the agent(s) 20, 22 may be accomplished by thermal inkjet printing, piezoelectric inkjet printing, continuous inkjet printing, etc. The controller 62 may process data, and in response, control the applicator(s) 24, 24' (e.g., in the directions indicated by the arrow 15", see FIG. 3) to deposit the agent(s) 20, 22 onto predetermined portion(s) of the polymeric material 16. It is to be understood that the agents 20, 22 may be applied in a single printing pass, or may be applied in separate printing passes.

In some examples of the method disclosed herein, the detailing agent 22 stored in the applicator 24' includes the non-polar, hydrophobic liquid, which may be an isoparaffinic hydrocarbon having a dynamic viscosity ranging from about 0.8 centipoise (cP) to about 40 cP at an application temperature ranging from about −80° C. to about 40° C. In some these examples of the method 100, the selective application of the detailing agent 22 involves ejecting the detailing agent 22 from a piezoelectric printhead 24' (see FIG. 2B.)

In some other examples of the method 100, the detailing agent 22 stored in the applicator 24' includes a non-polar, hydrophobic wax having a wax melting temperature. In these examples, prior to the selectively applying, the method further includes heating the non-polar, hydrophobic wax to at least its wax melting temperature to form the non-polar, hydrophobic liquid having a dynamic viscosity ranging from about 0.8 centipoise (cP) to about 40 cP at the wax melting temperature. This converts the wax form of the detailing agent 22 into a jettable liquid form of the detailing agent 22. Heating of the non-polar, hydrophobic wax may take place in a heating chamber just before it is delivered to the applicator 24'. Also in these examples, the polymeric material 16 may be preheated (for example, by infra-red light) prior to the application of the liquid form of the non-polar, hydrophobic wax to prevent the wax from reverting to a solid state when it contacts the polymeric material 16. It is to be understood that the wax melting temperature is below a melting temperature or a glass transition of the polymeric material 16.

It is to be understood that the other portion(s) 48 that receive the detailing agent 22 include polymeric material 16 that is not to become part of the final 3D object. In some examples, the detailing agent 22 may be applied solely at the edges of the patterned portion 28 and/or wherever notches, holes, etc. are to be formed. In these examples, some of the polymeric material 16 (e.g., at the outermost edges of the build area platform 12) may not be exposed to the detailing agent 22 or the fusing agent 20. Having non-patterned and non-detailed portions may be used when the polymeric material 16 does not substantially absorb the microwave radiation on its own. In other examples, the detailing agent 22 may be applied to all of the polymeric material 16 that is not to become coalesced.

Any example of the detailing agent described herein may be used in the method 100, and in an example, the detailing agent 22 is a non-polar, hydrophobic liquid that is immiscible with the fusing agent 20. Applying the hydrophobic detailing agent 22 adjacent to the edges of the patterned portion 28 repels the hydrophilic fusing agent 20 in the portion 28, and thus prevents the fusing agent 20 from spreading to the other portion(s) 48, which helps to define the voxels to be coalesced and hence the part form.

After the detailing agent 22 and the fusing agent 20 have been applied to the respective portions 48, 28, examples of the method 100 include exposing the polymeric material 16 to microwave radiation 30. The microwave radiation 30 may be applied by any suitable microwave heat source 26, such as microwave point sources or microwave arrays. Some specific examples include a microwave oven, microwave lamps, a magnetron that emits microwaves, etc.

The fusing agent 20 is responsive to the microwave radiation. The polar solvent and any microwave radiation absorber in the fusing agent 20 enhance the absorption of the microwave radiation, convert the absorbed radiation to thermal energy, and promote the transfer of the thermal heat to the polymeric material 16 in contact therewith. In an example, the fusing agent 20 sufficiently elevates the temperature of the polymeric material 16 in the portion(s) 28 to a temperature above the melting point or the glass transition temperature or within the melting range of the polymeric material 16, allowing coalescing/fusing (e.g., thermal merging, melting, binding, etc.) of the polymeric material 16 to take place.

The detailing agent 22 is non-responsive to the microwave radiation 30. As such, the other portion(s) 48 in contact with the detailing agent 22 are not heated and do not coalesce. The detailing agent 22 thereby prevents coalescence of the other portion 48 of the polymeric material 16.

Figure 2C:
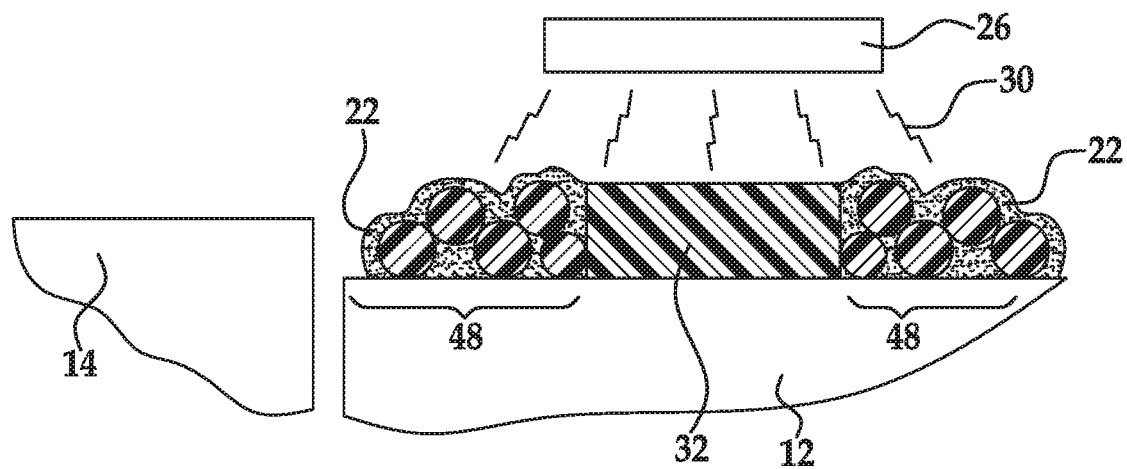

The application of the microwave radiation forms the object layer 32, shown in FIG. 2C. As shown, the portion 28 of the polymeric material 16 patterned with the fusing agent 20 and exposed to microwave radiation becomes a coalesced block, while the other portion 48 of the polymeric material 16 having the detailing agent 22 thereon remains as separable particles.

In examples of the method 100, the non-polar, hydrophobic liquid of the detailing agent 22 may have a sub-atmospheric distillation temperature lower than the melting temperature or the glass transition temperature of the polymeric material 16. The sub-atmospheric distillation temperature may be lower than the distillation temperature of the non-polar, hydrophobic liquid at atmospheric pressure. As such, when removal of the detailing agent 22 is desired after printing, the other portion(s) 48 may be exposed to heating at a suitable sub-atmospheric pressure. For recycling the polymeric material 16 that has not been coalesced, the method 100 further includes removing the non-polar, hydrophobic liquid from the other portion(s) 48 by heating the other portion(s) 48 to the sub-atmospheric distillation temperature at a corresponding pressure, thereby causing the non-polar, hydrophobic liquid to evaporate into a vapor. In an example, the other portion(s) 48 may be heated to about 100° C. at a pressure of 0.055 atmosphere (atm) to remove at least some of the isoparaffinic hydrocarbons disclosed herein.

The method 100 then includes separating the vapor from the polymeric material 16. In an example, the separation of the vapor from the polymeric material 16 involves pumping the vapor out of a chamber. In some instances, the recovered polymeric material 16 may be used again in a subsequent print cycle or process.

In examples, the detailing agent 22 may be reclaimed at decaking (where the coalesced polymeric material (i.e., printed parts) is removed from the powder bed).

At least some of the detailing agent 22 and other solvent(s) (e.g., from the fusing agent) that may remain after printing may be removed from the printed parts and patterned powder bed by vacuum extraction. Vacuum extraction involves heating to the sub-atmospheric distillation temperature at the corresponding pressure, thereby causing the non-polar, hydrophobic liquid to evaporate into vapor. Vacuum extraction may be used prior to decaking, for example, in order to remove at least some of the detailing agent 22 from areas adjacent to the printed parts and from the unpatterned powder before the printed parts are removed from the powder bed. This extraction process may also remove excess fusing agent solvent(s).

Figure 2D:
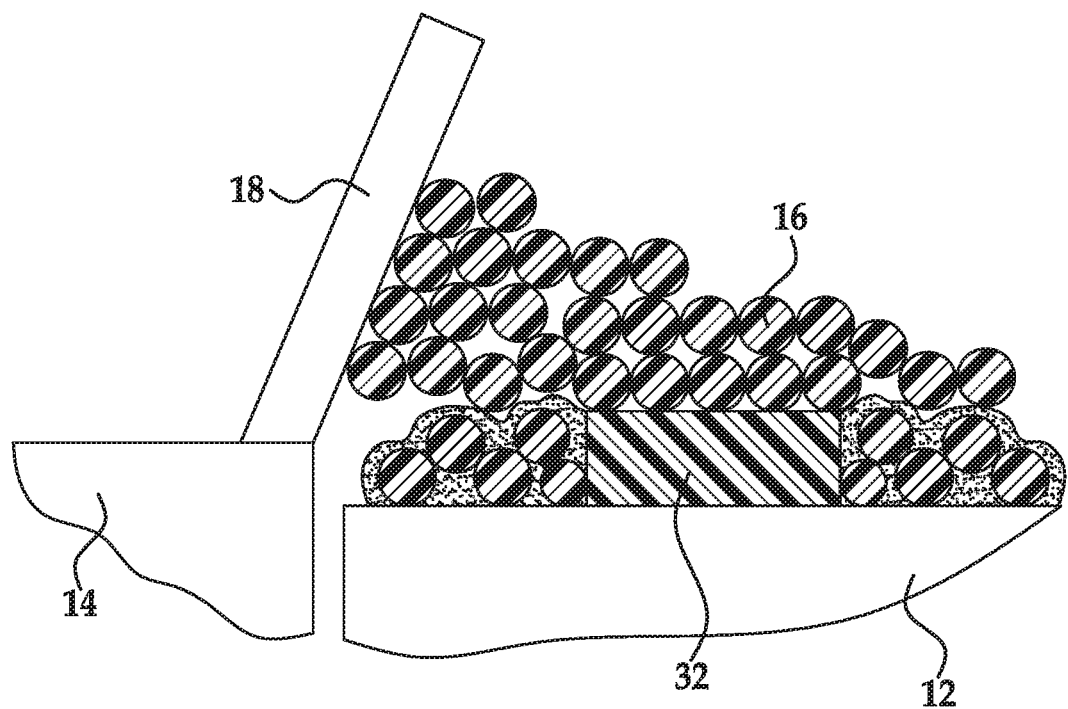

Once the part layer 32 is formed, additional polymeric material 16 may be applied on the part layer 32, as shown in FIG. 2D. While not shown, it is to be understood that the processes shown in FIGS. 2B and 2C may then be repeated to form an additional object layer. More specifically, the fusing agent 20 is selectively applied on at least a portion of the additional polymeric material 16, according to a pattern of a cross-section for the new layer which is being formed; and the detailing agent 22 is selectively applied on at least another portion of the additional polymeric material 16 that is not to become part of the new layer. After the agents 20, 22 are applied, the entire layer of the additional polymeric material 16 is exposed to microwave radiation in the manner previously described. The application of the polymeric material 16, the selective application of each of the fusing agent 20 and the detailing agent 22, and the exposure to microwave radiation 30 may be repeated a suitable number of cycles in order to form the final 3D object according to a 3D object model.

As such, some examples of the method include iteratively applying individual polymeric material 16 layers; based on a 3D object model, selectively applying a fusing agent 20 (including at least 5 vol % water) to at least some portions 28 of at least some of the individual polymeric material layers to pattern several layers of a 3D object part; based on the 3D object model, selectively applying a detailing agent 22 (a non-polar, hydrophobic liquid that is immiscible with the fusing agent 20) to some other portions 48 of the at least some of the individual polymeric material layers 16; and exposing the individual polymeric material layers 16 to microwave radiation, whereby any fusing agent 20 present increases in temperature to coalesce respective portions in contact with the fusing agent 20 and any detailing agent 22 present is non-responsive to the microwave radiation thereby preventing coalescence of respective other portions in contact with the detailing agent 22. In any given repeated build cycle, it is to be understood that the detailing agent 22 may not be applied to the polymeric material layer, for example, if the fusing agent 20 is applied to the entire layer.

3D Printing System

Referring now to FIG. 3, an example of the 3D printing system 10 that may be used to perform examples of the method 100 disclosed herein is depicted. It is to be understood that the 3D printing system 10 may include additional components (some of which are described herein) and that some of the components described herein may be removed and/or modified. Furthermore, components of the 3D printing system 10 depicted in FIG. 3 may not be drawn to scale and thus, the 3D printing system 10 may have a different size and/or configuration other than as shown therein.

In an example, the three-dimensional (3D) printing system 10, comprises: a supply 14 of build material particles 16; a build material distributor 18; a supply of a fusing agent 20 and a supply of a detailing agent 22; applicator(s) 24, 24' for selectively dispensing the agents 20, 22; a controller 62; and a non-transitory computer readable medium having stored thereon computer executable instructions to cause the controller 62 to cause the printing system to perform some or all of the method disclosed herein.

As mentioned above, the build area platform 12 receives the polymer material 16 from the build material supply 14. The build area platform 12 may be integrated with the printing system 10 or may be a component that is separately insertable into the printing system 10. For example, the build area platform 12 may be a module that is available separately from the printing system 10. The build area platform 16 that is shown is one example, and could be replaced with another support member, such as a platen, a fabrication/print bed, a glass plate, or another build surface.

While not shown, it is to be understood that the build area platform 12 may also include built-in heater(s) for achieving and maintaining the temperature of the environment in which the 3D printing method is performed.

Also as mentioned above, the build material supply 14 may be a container, bed, or other surface that is to position the polymeric material 16 between the build material distributor 18 and the build area platform 12. In some examples, the build material supply 14 may include a surface upon which the polymeric material 16 may be supplied, for instance, from a build material source (not shown) located above the build material supply 14. Examples of the build material source may include a hopper, an auger conveyer, or the like. Additionally, or alternatively, the build material supply 14 may include a mechanism (e.g., a delivery piston) to provide, e.g., move, the polymeric material 16 from a storage location to a position to be spread onto the build area platform 12 or onto a previously patterned layer.

As shown in FIG. 3, the printing system 10 also the build material distributor 18 and the applicator(s) 24, 24'.

Each of the previously described physical elements may be operatively connected to the controller 62 of the printing system 10. The controller 62 may process print data that is based on a 3D object model of the 3D object/part to be generated. In response to data processing, the controller 62 may control the operations of the build area platform 12, the build material supply 14, the build material distributor 18, and the applicator(s) 24, 24'. As an example, the controller 62 may control actuators (not shown) to control various operations of the 3D printing system 10 components. The controller 60 may be a computing device, a semiconductor-based microprocessor, a central processing unit (CPU), an application specific integrated circuit (ASIC), and/or another hardware device. Although not shown, the controller 62 may be connected to the 3D printing system 10 components via communication lines.

The controller 62 manipulates and transforms data, which may be represented as physical (electronic) quantities within the printer's registers and memories, in order to control the physical elements to create the printed article. As such, the controller 62 is depicted as being in communication with a data store 64. The data store 64 may include data pertaining to a 3D object to be printed by the 3D printing system 10. The data for the selective delivery of the polymeric material 16 and the agents 20, 22 may be derived from a model of the object to be formed. For instance, the data may include the locations on each polymeric material layer, etc. that the applicator 24, 24' is to deposit the fusing agent 20 and/or the detailing agent 22. The data store 64 may also include machine readable instructions (stored on a non-transitory computer readable medium) that are to cause the controller 62 to control the amount of polymeric material 16 that is supplied by the build material supply 14, the movement of the build area platform 12, the movement of the build material distributor 18, the movement of the applicators 24, 24', etc.

As shown in FIG. 3, the printing system 10 also includes the radiation source 26. Examples of the radiation source 26 include any microwave radiation source. As shown in FIG. 3, the radiation source 26 may be a module that is available separately from the printing system 10. In other examples, the radiation source 26 may be integrated with the printing system 10.

The radiation source 26 and/or the heater(s) in the build area platform 12 may be operatively connected to a driver, an input/output temperature controller, and temperature sensors, which are collectively shown as heating system components 66. The heating system components 66 may operate together to control the radiation source 26 and/or the heater(s) in the build area platform 12. The temperature recipe (e.g., heating exposure rates and times) may be submitted to the input/output temperature controller. During heating, the temperature sensors may sense the temperature of the polymeric material 16 on the platform 12, and the temperature measurements may be transmitted to the input/output temperature controller. For example, a thermometer associated with the heated area can provide temperature feedback. The input/output temperature controller may adjust the radiation source 26 and/or the heater(s) in the build area platform 12 power set points based on any difference between the recipe and the real-time measurements. These power set points are sent to the drivers, which transmit appropriate voltages to the radiation source 26 and/or the heater(s) in the build area platform 12. This is one example of the heating system components 66, and it is to be understood that other heat control systems may be used. For example, the controller 62 may be configured to control the radiation source 26 and/or the heater(s) in the build area platform 16.

It is to be understood that the ranges provided herein include the stated range and any value or sub-range within the stated range, as if such values or sub-ranges were explicitly recited. For example, from about 0.8 centipoise (cP) to about 40 cP should be interpreted to include not only the explicitly recited limits of from about 0.8 centipoise (cP) to about 40 cP, but also to include individual values, such as about 4 cP, 9.8 cP, 13 cP, 45 cP, etc., and sub-ranges, such as from about 1 cP to about 14 cP, from about 1.13 cP to about 3.04 cP, from about 1 cP to about 30 cP, etc. Furthermore, when "about" is utilized to describe a value, this is meant to encompass minor variations (up to +/−10%) from the stated value.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

While several examples have been described in detail, it is to be understood that the disclosed examples may be modified. Therefore, the foregoing description is to be considered non-limiting.

What is claimed is:

1. A three-dimensional (3D) object printing kit, comprising:
a polymeric powder material having an average particle size from about 2 μm to about 200 μm;
a fusing agent including at least 5 vol % of a polar solvent; and
a detailing agent contained separately from the polymeric powder material and the fusing agent, wherein the detailing agent consists of a non-polar, hydrophobic substance selected from the group consisting of a non-polar, hydrophobic liquid in its liquid state at a temperature ranging from about −80° C. to about 40° C. and a non-polar, hydrophobic wax having a wax melting temperature less than 120° C.

2. The 3D object printing kit as defined in claim 1 wherein the polymeric material is selected from the group consisting of polyethylene, polypropylene, polyvinylidene fluoride (PVDF), polystyrene, acrylonitrile butadiene styrene, polytetrafluoroethylene (PTFE), thermoplastic synthetic elastomers based on non-polar monomer segments, and combinations thereof.

3. The 3D object printing kit as defined in claim 1 wherein the non-polar, hydrophobic substance is the liquid, and the liquid is an isoparaffinic hydrocarbon.

4. The 3D object printing kit as defined in claim 3 wherein the isoparaffinic hydrocarbon has a dynamic viscosity ranging from about 0.8 centipoise (cP) to about 40 cP at an application temperature ranging from about −80° C. to about 40° C.

5. The 3D object printing kit as defined in claim 1 wherein the non-polar, hydrophobic substance is the wax, and the wax is a paraffin wax.

6. The 3D object printing kit as defined in claim 5 wherein the non-polar, hydrophobic wax forms a second liquid having a dynamic viscosity ranging from about 0.8 centipoise (cP) to about 40 cP when the non-polar, hydrophobic wax is heated to at least the wax melting temperature.

7. The 3D object printing kit as defined in claim 1 wherein the non-polar, hydrophobic substance has a sub-atmospheric distillation temperature lower than a melting temperature or a glass transition temperature of the polymeric material.

8. The 3D object printing kit as defined in claim 1 wherein the polymeric powder material is selected from the group consisting of polyvinylidene fluoride (PVDF), polystyrene, acrylonitrile butadiene styrene, polytetrafluoroethylene (PTFE), and combinations thereof.

9. The 3D object printing kit as defined in claim 1, wherein the non-polar, hydrophobic substance is the non-polar, hydrophobic liquid in its liquid state at a temperature ranging from about −80° C. to about 40° C.

10. The 3D object printing kit as defined in claim 9, wherein the non-polar, hydrophobic liquid is an isoparaffinic hydrocarbon selected from the group consisting of a C10-C11 isoparaffin having a dynamic viscosity of 0.84 cP, a C11-C12 isoparaffin having a dynamic viscosity of 1.13 cP, a C13-C14 isoparaffin having a dynamic viscosity of 1.04 cP, and an isoparaffinic hydrocarbon having a dynamic viscosity of 13.85 cP.

11. The 3D object printing kit as defined in claim 9, wherein the non-polar, hydrophobic liquid is a C10 or C14 isoparaffinic hydrocarbon.

12. The 3D object printing kit as defined in claim 9, wherein the non-polar, hydrophobic liquid is an isoparaffinic hydrocarbon having a dynamic viscosity ranging from about 0.8 cP to 1.13 cP.

13. The 3D object printing kit as defined in claim 9, wherein the non-polar, hydrophobic liquid is an isoparaffinic hydrocarbon having a dynamic viscosity ranging from 3.04 cP to about 40 cP.

* * * * *